H. W. BEINS.
Vulcanizing Apparatus.
No. 77,952.  Patented May 19, 1868.
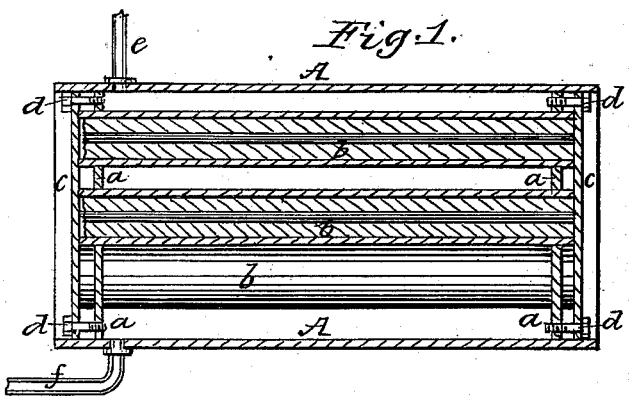
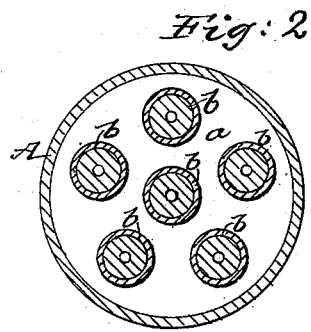
Witnesses  Inventor:

United States Patent Office.

HENRY W. BEINS, OF MOUNT VERNON, NEW YORK.

Letters Patent No. 77,952, dated May 19, 1868.

IMPROVEMENT IN VULCANIZING INDIA-RUBBER CAR-SPRINGS AND OTHER ARTICLES.

The Schedule referred to in these Letters Patent and making part of the same.

TO ALL WHOM IT MAY CONCERN:

Be it known that I, HENRY W. BEINS, of Mount Vernon, in the city, county, and State of New York, have invented a new and useful Improvement in Vulcanizing India Rubber; and I do hereby declare the following to be a full, clear, and exact description thereof, which will enable those skilled in the art to make and use the same, reference being had to the accompanying drawing, forming part of this specification, in which drawing—

Figure 1 represents a longitudinal section of this invention.

Figure 2 is a transverse section thereof.

Similar letters indicate corresponding parts.

This invention relates to an improvement in vulcanizing India rubber, and it is illustrated in this example, by showing its application to the vulcanization of India-rubber cylinders for making car-springs. Such cylinders are usually made about eight inches in diameter, and about thirty-two inches long, and are intended to be cut in four or more parts after they have been vulcanized.

The present mode of vulcanizing these springs is as follows:

After the mass is brought to a proper thickness, by winding the material on a mandrel, it is then put into a tubular mould of the proper diameter and length. The diameter of the moulds varies from four to twelve inches, and their length from twenty-four to thirty-two inches. After the moulds have been filled, a cap is put on each end of the moulds, with its proper hole in the centre, secured by a bolt passing through the entire length of each mould.

After the moulds have been filled, and their caps properly secured, to keep the rubber from swelling out, said moulds are put into a heater. This heater is then filled with steam of a proper temperature. By the steam the mass is thoroughly heated, and the vulcanizing or curing process progresses until it is interrupted or terminated by the operator. During this process, the entire moulds, caps and all, are surrounded by steam, and it is found that the ends of the rubber in each mould are liable to be over-cured, because the steam is allowed to act not only against the periphery of the moulds, but also against their ends, and if the operation is stopped when the ends are sufficiently vulcanized, the middle portion of the rubber is liable to be left too slack, or, in other words, not sufficiently vulcanized.

This disadvantage I have overcome by securing the moulds in the heads of the heater, leaving the ends of said moulds to project in such a manner that, when the caps are attached to the moulds, the steam is prevented from coming in direct contact with the ends of the moulds, and the India-rubber cylinders contained in said moulds are heated and vulcanized uniformly throughout their entire length, the heat being allowed to act on the rubber only from circumference to centre, so that the mass is necessarily heated and vulcanized uniformly, and not in different degrees at different portions of the mass, as by the old method.

The letter A represents a heater made of iron or any other suitable material, in the form of a cylinder, or in any desirable shape or form. The heads, $a$, of this heater are perforated, to receive the tubular moulds $b$, and these moulds are made of such a length that they project an equal distance beyond the heads, as clearly shown in fig. 1 of the drawing.

These projecting ends of the moulds $b$ are closed by caps $c$, which are, by preference, made of disks, extending over the ends of all the moulds, so that, by attaching or removing two caps, one at each end, all the moulds are simultaneously closed or opened, and but little time is required to perform this operation. If desired, however, each mould might be provided with its own distinct cap.

The caps $c$ are secured in their places by screws $d$, or by any other suitable means for fastening them in the required position.

The heater A is provided with the aperture, $e$, through which steam is admitted, and with another aperture, $f$, through which the steam exhausts.

The operation is as follows: The cylindrical pieces of India rubber which are to be vulcanized are introduced into the moulds $b$, then the caps $c$ are applied and fastened in their position, and, by admitting steam into the heater, the operation of vulcanizing or curing is effected.

By means of the heads $a$ the steam is prevented from coming into direct contact with the moulds at or around their ends, and the masses of India rubber contained in said moulds are uniformly heated and vulcanized throughout their entire length. By these means much waste of India rubber is avoided, and the operation of curing or vulcanizing car-springs or other articles can be effected with security, and with comparatively little loss of time.

Having thus described my invention, what I claim as new, and desire to secure by Letters Patent, is—

The moulds $b$, secured in the heads or plates, $a$, of the heater, and having their ends extending beyond such heads or plates, substantially as and for the purpose set forth.

H. W. BEINS.

Witnesses:
    E. F. KASTENHUBER,
    J. C. POLLER.